Oct. 15, 1963 L. CAHN 3,106,978
ELECTRICAL BALANCE
Filed March 18, 1960 2 Sheets-Sheet 1
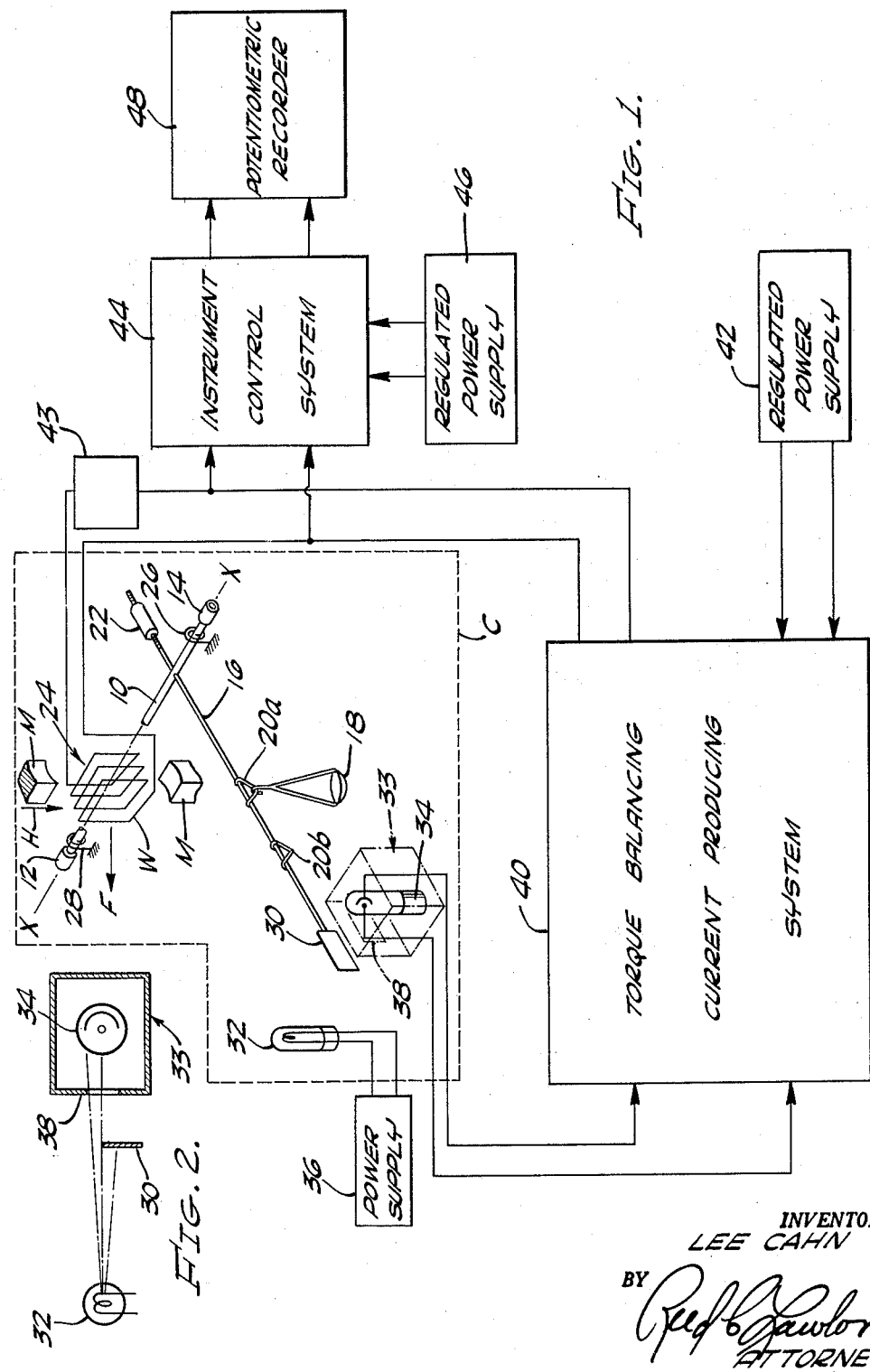
INVENTOR.
LEE CAHN Oct. 15, 1963
L. CAHN
3,106,978
ELECTRICAL BALANCE
Filed March 18, 1960
2 Sheets-Sheet 2
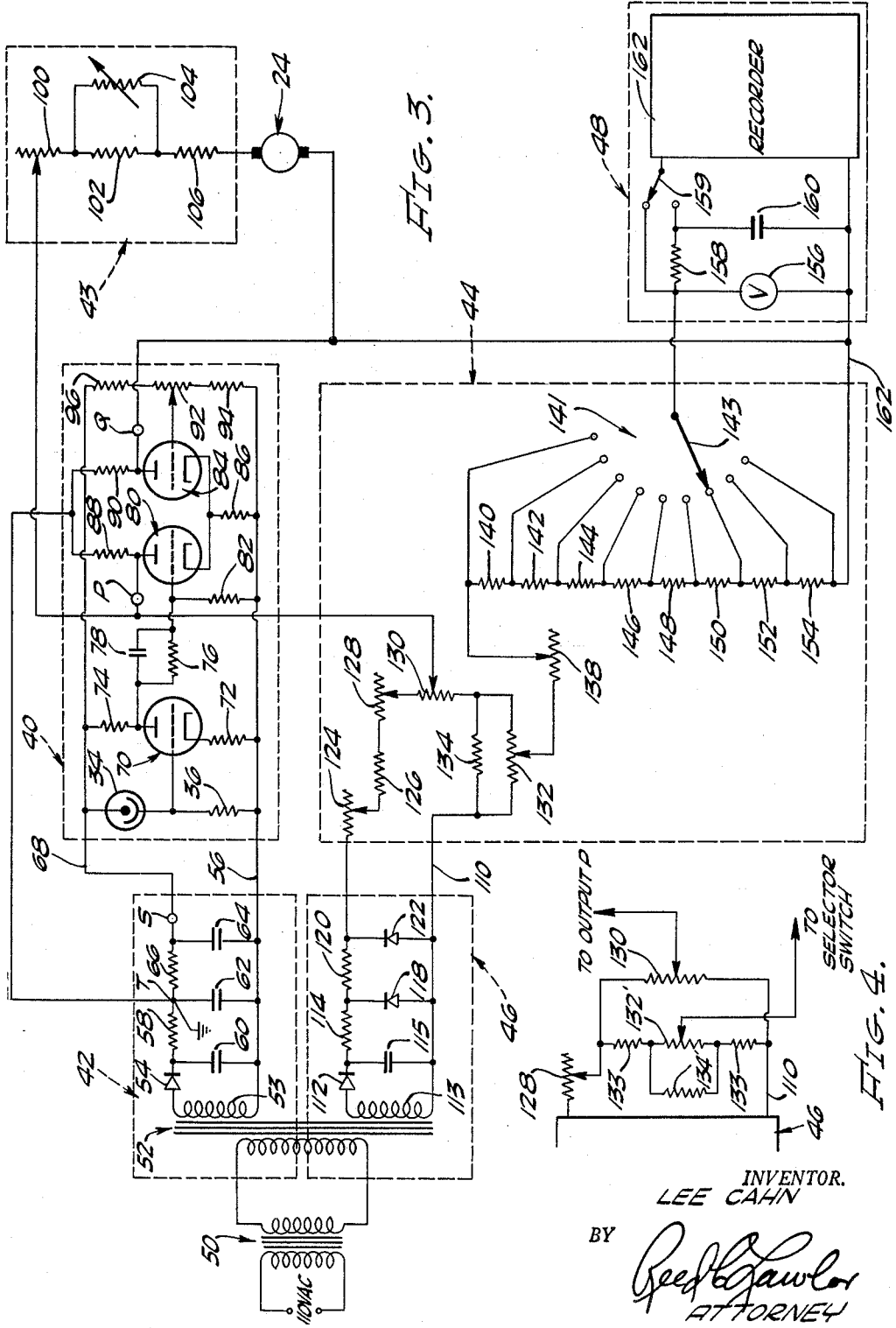
INVENTOR.
LEE CAHN
BY Reed C. Lawler
ATTORNEY

United States Patent Office 3,106,978
Patented Oct. 15, 1963

3,106,978
ELECTRICAL BALANCE
Lee Cahn, Hollywood, Calif.
(2404 Moreno Drive, Los Angeles 39, Calif.)
Filed Mar. 18, 1960, Ser. No. 15,999
15 Claims. (Cl. 177—210)

The present invention is directed to an improved electrical weight measuring system, and it is more particularly concerned with improved recording electrical balances.

In such electrical balances, a weighing or balance beam or arm is pivotally mounted for rotation about a fulcrum, and a weighing pan is located on the weighing arm at some distance from the fulcrum. In recording-type electrical balances of the type which have been employed heretofore, a transducer in the form of a displacement detector has been mounted adjacent the end of the balance arm to detect the displacement of the balance beam from a neutral or reference position when a specimen to be weighed is placed on the weighing pan, and an electrical signal has been generated in accordance with the deflection of the balance beam from a reference or zero-weight position. The electrical signal so produced has been recorded by means of a self-balancing potentiometric recorder. The accuracy of such a system is limited largely by inaccuracies introduced by the transducer. Some of these inaccuracies arise because of the force which the transducer itself applies to the balance arm. Others arise because the electrical output of the transducer is not accurately proportional to the displacement of the balance beam.

The improved balance of the present invention utilizes a system for detecting the displacement of the balance beam from a neutral or zero position and for automatically producing a counterbalancing electromagnetic torque to reduce that displacement to zero or nearly zero. When this invention is applied to a recording type of electrical balance, a potentiometric recorder is controlled in accordance with the electrical voltage that is supplying the electromagnetic torque. The invention, however, may also be employed by utilizing an indicating voltmeter for measuring the voltage producing the electromagnetic torque. In either event, an automatic self-balancing electrical balance is provided which quickly indicates weights or changes of weight with a higher degree of precision than has been attained heretofore and which is free of errors otherwise introduced by the non-linear characteristics of the displacement detector.

More particularly, in accordance with this invention a signal produced by a displacement detector in accordance with the deviation of the balance arm from the neutral or reference or zero-weight position is utilized to generate an electrical voltage in accordance with that displacement; but by means of a self-balancing system the deflection is maintained small or zero, thus eliminating any substantial non-linear effect that would otherwise be associated with large deflections. In this invention the electrical voltage that is produced in accordance with the deviation is utilized in turn to generate the electromagnetic torque for opposing the deflection of the balance beam from its neutral position. The electrical voltage so produced and utilized is measured to provide an indication of the weight of the object being weighed.

In practice, it is found that the torque provided by the torque motor depends not only on the current flowing through it, but also on the temperature of the torque motor. Accordingly, in order to achieve best results, a temperature-compensating network is connected with the winding of the torque motor and the electrical voltage mentioned above is applied across the entire torque motor circuit including both the torque motor winding and the temperature-compensating network. With such a temperature-compensating network, the voltage provides an accurate determination of the torque, and hence the weight of the sample over a wide temperature range.

In the best embodiment of the invention now known, a torque motor is employed for producing the electromagnetic torque and the voltage applied across the torque motor circuit is measured by means of a high impedance circuit connected in parallel therewith. This latter circuit includes a voltmeter or similar means for measuring the voltage produced across its input; that is, the voltage impressed on the torque motor circuit. In one form of the invention, the voltmeter may be of the indicating type which moves a pointer by a distance proportional to the voltage applied thereto. In another form, the voltmeter may be of the digital type. But in the best embodiment of the invention, the voltmeter is in the form of a potentiometric recorder. For simplicity all of these devices will sometimes be referred to hereinafter as voltmeters.

In order to achieve a high degree of precision in the measurements of sample weight by means of a voltmeter of predetermined sensitivity, a voltage source is inserted in series with the voltmeter to balance out a large fraction of the voltage applied across the measuring circuit. With this arrangement, the inserted voltage is adjusted to a value which balances out the weight of a pan and the major portion of the weights of the samples being investigated, so that the differences in weights of a series of samples or small changes in the weight of a single sample may be precisely measured by means of the voltmeter. With this invention, a sample may be weighed automatically. When an object is placed on the weighing pan, the weight is indicated instantly on the voltmeter. Furthermore, if the weight of the sample is changing, these changes are indicated instantly, and furthermore, such changes are indicated with a very high precision.

In a particular embodiment of the invention to be described, a rotatably mounted shaft having a balance beam affixed thereto extends transversely of the longitudinal axis of the shaft. A suitable weighing pan is suspended from the beam at a position spaced from the axis of the shaft, and the sample whose weight is to be measured is placed in the pan. A torque motor is mechanically coupled to the shaft, and an electric torque current-producing system controlled in accordance with the deflection of the beam is electrically coupled to that motor.

In the specific embodiment of the invention described, the deflection of the balance beam from its neutral position is detected by the means of a phototube and a light source. To facilitate detection of such deflection, a shutter member is mounted on the balance beam and the phototube and the light source are mounted on opposite sides of the plane of movement of the shutter member. With this arrangement, a change in weight varies the amount of light reaching the phototube, and this in turn changes the torque-producing current, thereby causing a change in the voltage recorded or otherwise indicated by the voltmeter.

More particularly, when a sample is placed on the weighing pan, the balance beam and shutter member are deflected downwardly, thereby permitting a larger amount of light from the light source to strike the phototube. In this manner, the amount of light incident on the phototube increases as a function of the weight of the sample. Thus, the phototube produces an electrical signal which increases by an amount that is about proportional to the increase in the amount of light directed to the phototube and that signal change is amplified to produce a current that is applied to the torque motor. The current applied to the torque motor causes the motor to exert a restraining torque on the shaft, thereby opposing the deflection of the shutter and the balance beam from their neutral positions. In the system specifically described herein in detail, complete neutralization of the deflection is not achieved but the residual deflection produced by the combined effect of the weight on the pan and the current on the torque motor is extremely small, being nearly proportional to the weight of the object being weighed. However, complete neutralization could be achieved by modifying the invention to take advantage of servo principles. In either event, when a change in sample weight occurs, the change in voltage established across the torque motor circuit which produces the balancing current, is very nearly exactly proportional to the change in weight of the sample.

When a series of samples is being weighed, these samples are placed successively on the pan and the difference in weights of the different samples are quickly indicated either by means of an indicating voltmeter, or they are recorded in successive positions of the recording chart of the potentiometric recorder. Furthermore, when the changing weight of a single sample is to be indicated, such changes may be indicated by means of a potentiometric recorder, or any other type of recording voltmeter, such as a digital voltmeter operating a print-out system. In practice, the indicating voltmeter or recording voltmeter, as the case may be, is calibrated to read weight directly in milligrams or other unit of interest.

In order to balance out any residual signal present due to the weight of the pan, or to a part of the weight of a changing sample, the balancing voltage mentioned above is adjusted by means of a "zero suppression" control circuit. With this control circuit the major part of the weight is balanced out by means of a calibrated potentiometer in the circuit and the remainder of the weight of the sample is read directly on the scale of the voltmeter. This "zero suppression" aspect of the present invention is a most important feature in that it permits precise comparison of the weights of samples to an accuracy beyond the normal capabilities of the weight measuring instrument. It permits, for example, reading such weight differences to 0.01% of the total weight of the sample to be made with a recorder or other voltmeter normally capable of readings to 1% of its full scale.

The "zero suppression" control referred to above permits minute variations in the weight of the sample to be indicated accurately. For example, the zero-suppression control can be used to set to zero any point of the voltmeter to correspond to any weight within the range of the balance, and the measuring circuit may be set so that any convenient weight increment within a predetermined range will correspond to the range of the voltmeter. For example, the zero suppression circuit may be adjusted so that "zero" on the chart of a potentiometric recorder represents 99 milligrams. Then the sensitivity selector of the measuring instrument may be so set that a weight increment of 1 milligram will produce full-scale deflection. Under these circumstances, each 1% division on the chart represents .01 milligram.

Yet another important feature of the embodiment of the present invention to be described is the provision of improved circuitry in the torque current producing system, which provides extremely fast and stable response in the system and a high degree of precision.

Furthermore, the electrical balance of this invention is of rugged construction and of relatively light weight, thus rendering it readily portable. Moreover, the improved balance of this invention is relatively insensitive to environmental changes, vibrations, air currents, ambient temperatures, and other extraneous factors.

Summarizing briefly, the principal objects of the present invention are to provide an improved electrical balance which is self-balancing and which is capable of rapidly and accurately weighing samples having weights within predetermined ranges, which is reliable over a wide temperature range, and which is constructed in a unique and improved manner to provide a rugged portable instrument.

Further objects and advantages of the invention will become apparent from a consideration of the following specification in conjunction with the accompanying drawings, in which:

FIGURE 1 is a representation, partly diagrammatic and partly block form, of one embodiment of the improved electrobalance of the invention;

FIGURE 2 is a schematic representation of the displacement transducer in which the amount of light from a light source incident on a photo tube varies with the balance beam deflection;

FIGURE 3 is a wiring diagram of the control circuits of the embodiment of the invention shown in FIGURE 1; and FIGURE 4 is a wiring diagram of an alternative form of zero-suppression network.

Reference is now made to the drawings for a more detailed description of the invention. The system of FIGURE 1 includes a shaft 10 that is supported at its opposite ends in suitable bearings 12 and 14 to render it rotatable about its longitudinal axis $x$—$x$. A balance beam 16 is affixed to the shaft 10, and the beam 16 extends transversely of the longitudinal axis of that shaft.

A weighing pan or container 18 is suspended from the beam 16 by means of a hook 20a fixed to the balance beam. However, the container may be suspended from a hook 20b fixed to a different part of the balance beam to provide a different range of weight measurements. A counterbalance 22 is adjustably supported on the opposite end of the beam 16 to balance the weight of the container 18 at least approximately. The sample to be weighed is placed in the container 18 and this causes the beam 16 to be deflected downwardly which, in turn, causes the shaft 10 to be pivoted about its longitudinal axis.

The rotor winding W of a torque motor 24 is mounted on the shaft 10 as illustrated schematically in FIG. 1. A stator of the torque motor provides a stationary magnetic field H that is directed normal to the shaft 10. The axis of the winding W is transverse, usually about perpendicular, to the magnetic field H. With this arrangement, when a current flows through the winding in the proper direction, the motor produces a restraining, or neutralizing, torque on that shaft to balance the torque produced by the sample placed in the pan 18. The stator supplying the field may be of a type that is designed to be uniform and normal to the path of the winding over at least a few degrees of coil rotation. A pair of spring-like members 26, 28 mounted on the shaft 10 may be used to connect the energizing leads to the torque motor 24. The polarity of the connection is such that the torque supplied by the motor tends to rotate the shaft 10 in the opposite direction from the torque produced by adding a sample to the pan.

A shutter member, or flag, 30 is mounted on the end of the beam 16. This member is positioned in the light path between an appropriate light source 32 and a phototube 34. The light source 32 may be energized by a D.C. power supply 36. A fixed mask 38 having a rectangular aperture therein is positioned between the flag 30 and the photocell to localize the projection of light rays from the source to a conical zone intersecting the phototube 34. The aperture may be in the form of a window of a compartment that encloses the photocell 34 as indicated in FIG. 2.

As best shown in FIG. 2, the amount of light incident on the phototube 34 is dependent upon the vertical position of the shutter 30. The assembly is constructed, for example, so that the intensity of the radiation incident on the phototube 34 is a minimum for zero weight in the container 18. Then, when a sample is placed in the container, the beam 16 and shutter 30 are deflected downwardly and the light incident on the phototube 34 from the source 32 increases.

The output signal of the phototube 34 is applied to a torque-balancing current-producing system 40. The system 40 amplifies the signal from the phototube 34 to produce an output voltage proportional to that signal. This output voltage is applied through a compensating network 43 across the winding W of the torque motor 24 to cause current to flow in the motor winding. This current flow, in turn, creates a magnetic field F which is transverse to the fixed magnetic field H and which reacts with the fixed magnetic field H to produce a restraining torque on the shaft 10. This restraining torque serves, as mentioned above, to balance the torque produced by the sample in the container 18. Under this balanced condition, the current-producing system 40 produces a voltage which is exactly proportional to the weight of the sample in the container 18. As explained hereinafter the compensating network 43 causes the restraining-torque current flowing in the winding W to have a calibrated value that is independent of temperature.

The voltage produced by the current producing system 40 is also applied across an instrument control system 44. The control system 44 is connected to a voltmeter such as a potentiometric recorder 48. The recorder, as noted above, is calibrated directly in weight values to provide a direct reading of the weight of the sample in the container 18.

Two separate regulated power supplies 42 and 46 are employed to provide regulated D.C. voltages to the torque-balancing current-producing system 40 and to the instrument control system 44 respectively. As shown in FIGURE 3, a transformer 50 is used to supply power to both the regulated power supplies 42 and 46. This transformer may, for example, be a regulating transformer of the type produced by the Sola Corporation. The primary winding of the transformer 50 may be connected to a 110 volt alternating current source, and the secondary winding may produce a regulated alternating current voltage of 120 volts, for example.

The secondary winding of the transformer 50 is connected to the primary of a power transformer 52. A first secondary winding 53 of the power transformer 52 supplies power for the regulated power supply 42, and a second secondary winding 113 of the power transformer supplies power to the regulated power supply 46.

The first secondary winding 53 of the transformer 52 is connected between the anode of a diode 54 and a common lower lead 56. The cathode of the diode 54 is connected to the junction of a resistor 58 and a capacitor 60. The other end of the resistor 58 is connected to the grounded point T. The other end of the capacitor 60 is connected to the lead 56. The diode 54 may be of the type presently designated 1N2071. The resistor 58 may have a resistance of 1 kilohm, for example. The capacitor 60 may have a capacity of 150 microfarads.

A capacitor 62, which may have a capacity of 150 microfarads, is connected between the lead 56 and the grounded point T. A capacitor 64 is connected between the lead 56 and a terminal point S, and this latter capacitor likewise may have a capacity of 150 microfarads. A resistor 66 of, for example, 10 kilohms, is connected between the terminal point S and the grounded point T.

The phototube is connected to the terminal S by way of a common upper lead 68 and its cathode is connected to one end of a resistor 36. The other end of the resistor is connected to the lower lead 56. The junction of the phototube 34 and the resistor 36 is connected to the control grid of an electron discharge tube 70. The phototube 34 is of the photo-emissive type presently designated as RCA922. The resistor 36 has a high resistance such as 10 megohms.

The electron discharge tube 70 may be one-half of a twin triode of the type presently designated 12AU7. The other electron discharge tubes used in the system, and which will be identified subsequently, also may be of this type.

The cathode of the discharge tube 70 is connected to one end of a resistor 72, the other end of which is connected to the lower lead 56, thus providing self-bias. The resistor 72 may, for example, have a resistance of 3300 ohms. The anode of the discharge tube 70 is connected to one end of a resistor 74, the other end of which is connected to the upper lead 68. This latter resistor may have a resistance of 47 kilohms, for example. The anode of the triode 70 is also connected to one end of a resistor 76, and that resistor is shunted by a capacitor 78. The resistor 76 may have a resistance of 4.7 megohms, for example; and the capacitor 78 may have a capacitance of 3300 micromicrofarads. The other end of the resistor 76 is connected to the control grid of a triode 80 and to one end of a resistor 82, the other end of which is connected to the lead 56. The resistor 82 may have a resistance of 2.2 megohms.

The second triode 80 and a third triode 84 form a differential amplifier. The cathodes of these triodes are connected together and to one end of a resistor 86, the other end of which is connected to the lower lead 56. The anode of the triode 80 is connected to one end of a resistor 88 which may have a resistance of 5.1 kilohms, and the anode of the triode 84 is connected to one end of a like resistor 90. The other ends of the resistors 88 and 90 are connected to the grounded point T of the regulated power supply 42.

The control grid of the triode 84 is connected to the movable arm of a potentiometer 92. The potentiometer 92 may have a resistance of 250 kilohms. The opposite ends of the potentiometer 92 are connected through a resistor 94 and a resistor 96 to the lower and upper leads 56 and 68 respectively. The resistor 94 may have a resistance of 120 kilohms. The resistor 96 may have a resistance of 820 kilohms.

The anode of the triode 80 is connected to an output terminal point P and the anode of the triode 84 is connected to an output terminal point Q. The voltage which produces the load balancing torque current is established across these terminals, as will be described in more detail subsequently.

The network 43 and the winding W of the torque motor are connected in series across the output terminals P and Q of the differential amplifier. The network 43 includes a rheostat 100, a fixed resistor 106, and a parallel network consisting of a thermistor 102 and an adjustable resistor 104 connected in series.

The terminal P is connected to the arm of the rheostat 100. This rheostat which may have a resistance of 600 ohms, for example, serves to adjust the current flow through the torque motor 24. This, in turn, calibrates the voltage that a particular sample weight will produce across the terminals P—Q. The calibration may be such, for example, that a sample weight of 20 milligrams will produce exactly 2.1 volts across the terminals P and Q to provide for direct reading of weight units in milligrams on a particular indicating device 48.

The thermistor may, for example, have a resistance of 180 ohms at 25° C., and it may exhibit a 4% resistance change for each ° C. The resistor 104 may have a resistance of about 200 ohms. The thermistor 102 may be mounted, for example, on the body of the stationary magnet M of the torque motor 24. The thermistor 102 serves to compensate for changes in the torque exerted by the torque motor in the presence of a fixed voltage across the terminals P and Q and in the presence of changing ambient temperature.

The resistors 102 and 104 are connected to the resistor 106, and the latter resistor is connected to one end of the winding W of the torque motor 24. The other end of the torque motor coil is connected to the terminal Q. The resistor 106 may have a resistance, for example, of 470 ohms.

The potentiometer 92 is manipulated to adjust the point of stable operation of the instrument. More particularly, by manipulating the potentiometer 92 the effective width of the slit formed by the mask 38 and the flag 30 in transmitting radiation from the source 32 to the phototube 34 may be varied and thereby set at some particular amount when no sample is in the weighing pan 18. Thereafter, when a sample is placed in the weighing pan, it exerts a torque on the shaft 10 and the beam 16, thereby deflecting the flag downwardly a small amount, causing an increase in the amount of light transmitted from the source 32 to the phototube 34. As a result, the magnitude of the signal supplied by the phototube 34 increases, thereby increasing the current flowing through the triode 70.

The resulting increase in current flow through the triode 70 causes its plate voltage to drop, thereby decreasing the magnitude of the signal applied to the control grid of the triode 80. The current flow through the triode 80 thereby decreases and the output voltage across the terminals P and Q increases.

The resulting voltage across the terminals P and Q produces a current through the winding W of the torque motor 24, and that current causes the torque motor to impose a torque on the shaft 10 which restrains and balances the torque exerted on that shaft due to the weight of the sample. This results in a stable condition in which the beam 16 is deflected only slightly downwardly by an amount proportional to the weight of the sample, and a voltage is developed across the terminals P and Q which is nearly exactly proportional to the sample weight.

The parameters and the constants of the various circuit elements and associated triodes 70, 80 and 84 are so selected that the triodes operate at intermediate points on their characteristic curves and an extremely stable negative feedback loop is produced. The capacitor 78 and the resistor 76 cooperate with the grid resistor 82 to provide a lead circuit, that is, a circuit in which the output voltage appearing across the resistor 82 leads the voltage supplied by the triode 70. By employing a lead circuit it is possible to utilize a higher loop gain than otherwise without introducing oscillations or other instabilities. With high loop gain, a high degree of linearity and measurement precision is obtained. Rapid response of the system is assured by the use of a photoemissive phototube 34. With this unique system, stable rapid operation over a wide range of circuit constants and sample weights is attained. The lead network and the phototube make it possible for the system to respond rapidly to changes in weight. With this amplifying system employing a high gain feedback loop and a lead circuit, the time required for the output to attain, say, 99% of its ultimate value is only about 1/30 of the time that would be required if the feedback loop were disconnected and a reading corresponding to the resultant static deflection measured.

With the circuit values set for the above, the loop gain in the system is greater than 1000, and the deflection with load is of the order of only .001 inch per milligram. This closed loop system with high gain eliminates the effects of varying tube characteristic variations on the supply voltage, component changes, and the like. The time constant of the RC combination 76, 78 is of about .01 second. No gain or damping control is required, and the system does not oscillate under any conditions encountered in use.

The voltage established across the output terminals P—Q is measured by the circuitry and components now to be described. It will be remembered that this voltage is precisely proportional to the sample weight. This measuring circuitry, as described in conjunction with FIGURE 1, includes the instrument control system 44, the regulated power supply 46, and the indicator and recorder instruments 48.

As shown in FIG. 3, the regulated power supply 46 derives its power from the second secondary winding 113 of the power transformer 52. The latter secondary winding is connected between a common lead 110 and the anode of a diode 112.

The cathode of the diode 112 is connected to one end of a capacitor 115, the other end of which is connected to the common lead 110. The cathode of the diode 112 is also connected through two resistors 114 and 120 in series with one end of a rheostat 124. The cathode of one end of a Zener diode 118 is connected to the junction between the two resistors 114 and 120, while its cathode is connected to the common lead 110. The cathode of a second Zener diode 122 is connected to the junction between the resistor 120 and the rheostat 124, while its anode is connected to the common lead 110. The diode 112 may be of the type presently referred to as 1N2069. The resistance of the resistor 114 may be 820 ohms, the capacitance of the capacitor 115 may be 150 microfarads. The Zener diode 118 may be of type 1N1524, which sustains a voltage of 12 volts across it, and the Zener diode 122 may be of type 1N468 which sustains a voltage of 4.6 volts across it. The resistance of the two resistors 114 and 120 may be 820 ohms and 470 ohms respectively, to provide a well-regulated voltage without overload, when the voltage developed across the secondary winding 113 is about 35 volts.

A parallel network consisting of a fixed resistor 134 and a potentiometer 132 is connected in series with the rheostat 124, a fixed resistor 126, and a rheostat 128, and a potentiometer 130 across the output of the power supply 46.

The moving arm of the rheostat 124 is connected to one end of resistor 126, the other end of which is connected to a rheostat 128. The potentiometer 130 and the potentiometer 132 are connected in series between the moving arm of the rheostat 128 and the common lead 110 of the power supply 46. The rheostat 124 has a resistance of 600 ohms. The resistance of the resistor 126 is 680 ohms, the resistance of the rheostat 128 is 25 ohms; the resistance of the potentiometer 130 is about 500 ohms. The potentiometer 130, however, is of the precision type, such as a precision potentiometer of the type presently marketed by Spectrol Corporation. This potentiometer, which is the control for "zero suppression," may be calibrated, for example, with a three-digit scale, and is equipped with a vernier indicator to facilitate reading the setting to the fourth digit. With this potentiometer, changes in dial reading are directly proportional to changes in voltage to four significant figures. The rheostat 124 provides a coarse calibration control for the potentiometer 130 while the rheostat 128 provides a fine calibration control for that potentiometer.

The potentiometer 132 serves as a "zero trim" control. While the counterweight 22 of FIG. 1 serves to balance out the major portion of the weight of the container 18, adjustment of the potentiometer 132 serves as a trim to subtract out any voltage due to compensate for slight differences in weights of different containers. Thus, the potentiometer 132 may be adjusted to compensate for differences in weights of different containers, without disturbing the setting of other rheostats and potentiometers.

The resistor 134 serves to reduce the effective resistance of the potentiometer 132, so as to enhance the resolution of the potentiometer 130.

The arm of the potentiometer 130 is connected to the output terminal P of the differential amplifier, and the moving arm of the potentiometer 132 is connected through a rheostat 138, and a series of tapped resistors, 140, 142, 144, 146, 148, 150, 152, and 154 in sequence to the other output terminal Q. The rheostat 138 may be about 2 kilohms. The resistors 140, 142, 144, 146, 148, 150, 152 and 154, which are of the precision type, have accurately defined resistance values. The respective resistances of these resistors may be, for example, 10,000, 6,000, 2,000, 1,000, 600, 200, 100 and 100 ohms. The junctions between the successive resistors 138, 140, 142, 144, 146, 148, 150, 152, and 154 are connected to different contacts of a selector switch 141.

The measuring device 48 is connected between the arm 143 of the selector switch and the output terminal Q. With this arrangement, any selected resistance value, as determined by the values of the precision resistors, 140, 142, 144, 146, 148, 150, 152 and 154 may be connected across the input of the measuring device 48. In this way, any selected fraction of the voltage appearing across the string of resistors 140, 142, 144, 146, 148, 150, 152, and 154 may be measured provided that that fraction lies within the range of the measuring device.

Since the total resistance of the "zero suppression" circuit and the string of resistors 140, 142, 144, 146, 148, 150, 152 and 154 is large compared with the effective output impedance of the torque-current generator 40, changes in the settings of the various rheostats 124, 128 and 138 and potentiometers 130 and 132 and the switch 143 do not affect the magnitude of the current flowing through the torque motor 24.

In the best embodiment of the invention, one input terminal of a strip-chart recorder 162 is connected to the output terminal Q of the differential amplifier, while the other input terminal of the recorder 162 is connected through a fixed resistor 158 to the switch arm 143 of the selector switch 141. A filter capacitor 160 is connected across the input terminals of the recorder 162. The resistance of the resistor 158 is about 22 kilohms, while the capacitance of the capacitor 160 is about 6 microfarads. The resistor 158 and the capacitor 160 thus form a low-pass filter to prevent excessively rapid transient signals from affecting the recorder 162 and to eliminate A.C. pickup. In case a recorder is employed which must be connected to a low-resistance source, the resistor 158 may be cut out by means of a switch 159. The filter is used only with recorders which can be used with signal sources having high input impedances.

The rheostat 138 serves as a fine calibration control for recorder 162.

The recorder 162 may be any potentiometric type of recorder. For example, the Moseley 3S X–Y Recorder, marketed by the F. L. Moseley Company of Pasadena, California; or the Varian Adjustable Span Recorder G–10, manufactured by Varian Associates of Palo Alto, California, may be used.

The circuitry and system described above causes a current to flow through the precision resistors 140, 142, 144, 146, 148, 150, 152 and 154; and that current is exactly proportional to the voltage established across the terminals P and Q. This voltage, in turn, is almost exactly proportional to the sample weight in the container 18 of FIGURE 1. The voltage established at successive contacts of the selector switch is, therefore, proportional to the sample weight, with each such voltage representing the sample weight in a different range of calibration on the voltmeter 156 or recorder 162.

As noted above, the "zero suppression" control 130 can be set so that "zero" on the voltmeter 156 or recorder 162 corresponds to a particular weight value. The selector switch 141 may then be set so that a full-scale deflection of the recorder 162 represents a weight range which may be only a small percentage of the total actual sample weight. When it is desired to employ an indicating voltmeter, the voltmeter may be connected across the entire string of calibrated resistors 140, 142, 144, 146, 148, 150, 152 and 154 if desired. Furthermore, suitable circuitry consisting of other calibrated resistors and switches may be employed to adapt the instrument for use with indicating or recording voltmeters or other utilization circuits that have other full-scale characteristics.

As mentioned previously, the voltmeter may be of any conventional type. For example, it may be in the form of a moving-coil voltmeter, or it may be a voltmeter of the digital type. In either case, such a voltmeter provides an extremely rapid means for indicating the values of weights of successive samples. It is also to be understood that appropriate electronic data handling equipment may be employed instead of an indicating voltmeter or recording device.

When the electromagnetic balance of this invention has been adjusted and is ready for use to weigh a particular series of samples whose weights are to be compared and which lie within a predetermined weight range, the potentiometer 130 is adjusted so as to produce a zero voltage indication on the recorder 162. Then the switch arm 143 is set to a range so that the full scale of the voltmeter or the full scale of the recorder 162 corresponds to the range of weights to be determined. By virtue of previous calibration, the approximate weights of the samples are read to four significant figures directly on the scale of the zero-suppression potentiometer 130. Thereafter, as the weights in the set of samples to be compared are placed one at a time on the pan, the difference between the weights of the various samples are indicated or recorded directly on the scale or chart of the measuring device 48.

With this invention the differences in weights of the various samples may be rapidly determined to an accuracy of, say, 1% of the full-scale reading of the measuring device 48 and thus to a precision of say 1 part in 10,000. In a particular example, where the zero-suppression potentiometer 130 has been set to produce a zero indication in the measuring system 48, to correspond to, say, 99.00 mg., and the range selector 141 has been set to produce a full-scale reading of the voltmeter 156 to correspond to a weight of 1 mg., then when two samples that have weights of in the range between 99.00 mg. and 100.00 mg. are placed on the pan successively, the weights may be determined with a precision of 0.01 mg.

The invention may, of course, be applied in many other ways. For example, it may be employed to measure the various densities of a series of liquids that are to be compared. This may be done by taking advantage of Archimedes' law in a system known as gravimetry. In this arrangement, a solid of known volume is suspended by means of a filament from one of the loops 20a or 20b, and the change in apparent weight of the sample is measured when the sample is immersed to a predetermined depth in each of the two bodies of liquids whose densities are to be compared. When using such a system, due account must be taken of the effects of surface tension on the filament. The invention may also be employed to determine surface tension directly, such as by hanging a U-shaped element in a liquid and determining the force with which the liquid pulls the U-shaped element toward the liquid.

It is not only important to be able to measure differences in weight of different samples but also changes in weight of the same sample under different conditions. Thus, for example, change in weight of a sample occurring when the temperature is changed, may be precisely measured to about 1 part per 10,000 of the weight of the sample, even though the total weight of the sample is not known to that degree of accuracy.

In the foregoing discussion, it has been assumed that each sample being weighed has a weight that exceeds the weight indicated by the reading of the potentiometer 130. The invention may also be utilized to weigh samples that have weights which are less than that indicated by the reading of the potentiometer 130.

In the modification represented by FIG. 4, weighings may be made of samples which have weights that are either greater than or less than the weight indicated by the potentiometer 130. In this case, it will be noted, a trimming potentiometer 132' and a shunt resistor 134' are connected between two equal resistors 133, 133 in a circuit that is in parallel with the potentiometer 130. The potentiometer 132' and resistor 134' may have the same values as the potentiometer 132 and resistor 134 and each of the resistors 133, 133 may have a resistance of 250 ohms. In this case the calibrated potentiometer has a zero reading at its center, thereby permitting the voltage supplied by the zero suppression circuit to have a polarity either the same as or the opposite from that of the voltage appearing across the output terminals P and Q depending upon the direction of movement of the sliding contact from the zero position on the potentiometer 130.

In practice, the balance, including the balance beam, the torque motor, the lamp and photo detector, are all mounted within a case indicated by the symbol C having a door through which weights may be added and removed. With this invention, it is not necessary to mount the case with the shaft 10 and the balance beam 16 in a horizontal plane, but merely in a plane that is nearly horizontal. In practice, after the case with the enclosed parts have been mounted preparatory to the making of a series of measurements, the instrument is calibrated by manipulation of the rheostat 109 or one or more of the rheostats 124, 128, and 138 to produce a predetermined reading on the measuring device 48 when a predetermined calibrated weight is added to the pan. Thus, with this arrangement, adjustments are readily made which compensate for deviations in the mounting of the balance from a predetermined or horizontal plane.

From the foregoing description, it is thus seen that this invention provides an improved self-balancing electrical weight-measuring system. The electrical balance of this invention is not only precise, but is simple to operate and may be manufactured and sold at relatively low cost. With this invention, as pointed out above, a very high degree of accuracy is achieved in the measurement of differences in weights of different samples or of the same sample at different times. With this invention, such differences are accurately measured to 1 part in 10,000. This high degree of accuracy is achieved with a self-balancing system by employing an amplifying system which provides a loop gain of at least 1,000 and then measuring small differences in weight by making use of the zero-suppression circuit and the measuring circuit as described. Such high loop gain is made possible by virtue of the use of a lead circuit in the feedback loop.

It is to be understood that this invention is not limited to the specific embodiment thereof described herein, but that many changes may be made therein as will now appear to those skilled in the art, without departing from the scope of the invention, as defined by the appended claims.

The invention claimed is:

1. In a force measuring system which includes, means deflectable in one direction from a reference position in response to a force to be measured, electrically activated restraining means coupled to said deflectable means for urging said deflectable means in the opposite direction when a voltage of a predetermined polarity is applied thereto, the combination of:
   a position transducer for sensing the position of said deflectable means for producing an electric signal having characteristic variations corresponding to changes in the position of said balance beam,
   electric circuit means coupled to said position transducer and responsive to said electric signal to produce a voltage across its output, a change in voltage appearing across said output being proportional to a change in the magnitude of said force,
   means controlled by said electric circuit means for applying voltage to said restraining means to maintain said deflectable means substantially in said reference position, and
   a voltage-measuring circuit coupled to said electric circuit means for measuring changes in voltage appearing in the output thereof, said voltage measuring circuit comprising a zero-suppression voltage source and means for measuring the difference between the voltage supplied by said source and the voltage produced by said electric circuit means,
   said voltage source comprising a potentiometer and a voltage supply connected thereacross,
   said measuring means comprising a resistor connected in series with an adjustable part of said potentiometer across the output of said electric circuit means, and
   a voltage measuring device having a predetermined range connected across said electric circuit means and having a range less than the voltage produced across said electric circuit means.

2. In a force measuring system which includes, a balance having a shaft which is rotatable about a pivot axis, a balance beam affixed to said shaft and extending transversely to said pivot axis, and means for applying a force to be measured to a point of said beam remote from said pivot axis, whereby said beam deflects from an established reference position to rotate said shaft in one direction, a torque motor including a coil coupled to said shaft for causing said shaft to rotate in the opposite direction when a voltage of a predetermined polarity is introduced across said coil to produce a torque-producing current therein, the combination of:
   a position transducer for sensing the position of said balance beam and for producing an electric signal having characteristic variations corresponding to changes in the force acting on said balance beam,
   electric circuit means coupled to said position transducer and responsive to said electric signal for producing a change in output voltage proportional to such change in force,
   a torque motor circuit connected to said circuit means and responding to said changes in voltage for producing changes in current through the winding of said torque motor,
   a voltage-measuring circuit coupled to said electric circuit means for measuring changes in voltage appearing in the output thereof, said voltage measuring circuit comprising a zero-suppression potentiometer and a resistance connected in series, and
   means for applying a voltage of predetermined magnitude across said potentiometer and means for measuring the voltage across said resistor.

3. In a weight measuring system which includes, a balance having a shaft which is rotatable about a pivot axis, a balance beam affixed to said shaft and extending transversely to said pivot axis, and means for supporting a weighing pan for an object to be weighed from a point on said beam remote from said pivot axis, such object causing said beam to be deflected from an established reference position and said shaft to rotate in one direction, a torque motor including a coil coupled to said shaft for applying a balancing torque thereto for causing said shaft to rotate in the opposite direction when a voltage of a predetermined polarity is introduced across said coil to produce a torque-producing current therein, the combination of:
   a position transducer for sensing the position of said balance beam and for producing an electric signal having characteristic variations corresponding to changes in the position of said balance beam,
   electric circuit means coupled to said position transducer and responsive to said electric signal for producing a change in output voltage proportional to such change in the position of said balance beam,
   a torque motor circuit connected to said circuits means and responding to said changes in voltage for producing changes in current through said coil for generating a restraining torque,
   a voltage-measuring circuit coupled to said electric circuit means responsive to the voltage appearing in the output thereof, said voltage measuring circuit comprising a zero-suppression potentiometer having a movable contact between the ends thereof, means including an adjustable voltage source for adjusting the voltage across said potentiometer,
a calibrated resistor,
means connected to said contact for connecting an adjustable portion of said potentiometer in series with said resistor across the output of said electric circuit means,
and means for measuring the voltage across said resistor.

4. In a weight measuring system as defined in claim 1 comprising a second potentiometer connected to apply an adjustable voltage in series with the voltages across said first potentiometer and said resistor.

5. In a force measuring system which includes, a balance having a shaft which is rotatable about a pivot axis, a balance beam affixed to said shaft and extending transversely to said pivot axis, and means for applying a force to be measured to a point of said beam remote from said pivot axis, whereby said beam deflects from an established reference position to rotate said shaft in one direction, a torque motor including a coil coupled to said shaft for causing said shaft to rotate in the opposite direction when a voltage of a predetermined polarity is introduced across said coil to produce a torque-producing current therein, the combination of:
 a position transducer for sensing the position of said balance beam and for producing an electric signal having characteristic variations corresponding to changes in the force acting on said balance beam,
 electric circuit means coupled to said position transducer and responsive to said electric signal for producing a change in output voltages proportional to such changes in force,
 a torque motor circuit connected to said circuit means, said torque motor circuit including a torque motor winding and a temperature-variable resistor, said temperature-variable resistor being mounted adjacent said torque motor, said torque motor circuit responding to said changes in voltage for producing changes in current through said winding for generating a torque that changes by an amount proportional to said change in voltage and independent of a change in temperature,
 and means coupled to said circuit means for measuring changes in said voltage to produce an indication of the deviation of the force from a predetermined amount.

6. A force measuring system as defined in claim 5 in which said torque motor winding and said temperature-variable resistor are connected in series.

7. In a microbalance that includes supporting means for supporting an object to be weighed, whereby the weight of the object tends to cause the supporting means to move in one direction, and electrically activated restraining means coupled to said supporting means for causing the same to move in the opposite direction when a D.C. voltage of a predetermined polarity is applied thereto for producing a restraining current therein,
 the combination therewith of:
 a position transducer for sensing the position of said supporting means and for producing a D.C. electrical signal having a magnitude corresponding to the displacement of said supporting means,
 first electric circuit means comprising a D.C. amplifier controlled by said D.C. electrical signal for feeding back to said restraining means a D.C. voltage to cause said restraining means to oppose the displacement of said supporting means when the weight of an object supported thereby is changed, said D.C. amplifier including a lead circuit, and
 second electric circuit means comprising zero-suppression means for neutralizing a fraction of said D.C. signal by a predetermined amount and also including means for detecting and measuring the portion of said D.C. electric signal that has not been neutralized.

8. In a microbalance that includes supporting means for supporting an object to be weighed, whereby the weight of the object tends to cause the supporting means to move in one direction, and electrically activated restraining means coupled to said supporting means for causing the same to move in the opposite direction when a D.C. voltage of a predetermined polarity is applied thereto for producing a balancing current therein,
 the combination therewith of:
 a position transducer for sensing the position of said supporting means and for producing a D.C. electrical signal having a magnitude corresponding to the displacement of said supporting means,
 first electric circuit means controlled by said D.C. electrical signal for feeding back to said restraining means a D.C. voltage to cause said restraining means to oppose the displacement of said supporting means when the weight of an object supported thereby is changed, and
 second electric circuit means comprising zero-suppression means for neutralizing a fraction of said D.C. signal by a predetermined amount and also including means for detecting and measuring the portion of said D.C. electric signal that has not been neutralized,
 said first circuit means comprises an amplifier including a differential amplifier that comprises two amplifying elements having two output terminals respectively and in which said D.C. voltage is developed across said output terminals, and in which said second electric circuit means is connected across said two output terminals.

9. A microbalance as defined in claim 8 wherein said second electric circuit comprises a potentiometer and a stepped resistor connected in series across said output terminals,
 said potentiometer being adjustable and being supplied with voltage from a regulated power supply whereby a zero-suppression voltage may be introduced into said second electric circuit to oppose the voltage appearing across said output terminals, and means for detecting the residual voltage appearing across a portion of said stepped resistor.

10. A microbalance as defined in claim 9 in which said potentiometer comprises a calibrated precision potentiometer, said microbalance also comprising means for adjusting the voltage applied across the ends of said potentiometer whereby the readings on the dials of said potentiometer may be calibrated to read directly that portion of the weight corresponding to the fraction of said signal being neutralized in said second electric circuit means whereby the difference between the weight being measured and the portion of the weight corresponding to the fraction of the signal being so neutralized corresponds to the voltage developed across a portion of said stepped resistor.

11. In a microbalance that includes supporting means for supporting an object to be weighed, whereby the weight of the object tends to cause the supporting means to move in one direction, and electrically activated restraining means coupled to said supporting means for causing the same to move in the opposition direction when a D.C. voltage of a predetermined polarity is applied thereto for producing a balancing current therein,
 the combination therewith of:
 a position transducer for sensing the position of said supporting means and for producing a D.C. electrical signal having a magnitude corresponding to the displacement of said supporting means,
 first electric circuit means controlled by said D.C. electrical signal for feeding back to said restraining means a D.C. voltage to cause said restraining means to oppose the displacement of said supporting means when the weight of an object supported thereby is changed, and
 second electric circuit means comprising zero-suppression means for neutralizing a fraction of said D.C. signal by a predetermined amount and also including means for detecting and measuring the portion of said D.C. electric signal that has not been neutralized, said restraining means also comprises a temperature-variable resistor mounted adjacent said torque motor, said resistor and the stator winding of said torque motor being so connected in said second electric circuit means that the current flowing through said stator winding is proportional to said D.C. electric signal but is independent of changes in temperature.

12. A microbalance as defined in claim 11 in which said restraining means comprises a calibrating rheostat, said stator winding, said temperature-variable resistor, and said calibrating rheostat all being connected in series, said temperature-variable resistor being mounted adjacent said torque motor.

13. In a microbalance that includes supporting means for supporting an object to be weighed, whereby the weight of the object tends to cause the supporting means to move in one direction, and electrically activated restraining means coupled to said supporting means for urging the same in the opposite direction when a D.C. voltage of a predetermined polarity is applied thereto for producing a weight balancing current therein, the combination therewith of:
a position transducer for sensing the position of said supporting means and for producing a D.C. electrical signal having a magnitude correspnding to the displacement of said supporting means from a reference position,
an amplifier controlled by said D.C. electrical signal for feeding back to said restraining means a D.C. voltage to cause said restraining means to oppose the displacement of said supporting means when the weight of an object supported thereby is changed,
an adjustably settable calibrated potentiometer for providing any one of a plurality of calibrated voltages corresponding to a plurality of indicated mass values, said potentiometer including means for indicating the mass value corresponding to the setting thereof, and
measuring means connected to the output of said amplifier and said potentiometer for measuring the difference between the voltage supplied thereby and the D.C. voltage acting on said restraining means whereby a change in said voltage indicates a change in the weight supported by said supporting means.

14. A microbalance as defined in claim 13 wherein said amplifier comprises a lead circuit and wherein the loop gain around the system exceeds 1000.

15. In a microbalance that includes a spring restrained pivotally mounted balance beam for supporting an object to be weighed, whereby said balance arm is urged to move in one direction in response to an increase in the weight of the object and in the opposite direction in response to a decrease in such weight, and a torque motor having a rotor connected to said balance arm for opposing the movement of said balance arm in one direction when a D.C. voltage of a predetermined polarity is applied to the winding of said rotor for producing a balancing current therein, the combination therewith of:
a position transducer for sensing the position of said balance arm and for producing a D.C. electrical signal having a magnitude corresponding to the displacement of said balance arm from a reference position;
an amplifier controlled by said D.C. electrical signal for feeding back to said rotor a D.C. current to cause said rotor to substantially neutralize the displacement of said balance arm that would otherwise occur in response to a change in the weight of an object supported thereby;
an adjustably settable calibrated potentiometer for providing any one of a plurality of calibrated voltages corresponding to a plurality of indicated mass values, said potentiometer including means for indicating the mass value corresponding to the setting thereof, and
measuring means connected to the output of said amplifier and said potentiometer for measuring the difference between the voltage supplied thereby and the D.C. voltage at said output acting on said rotor whereby a change in the D.C. current supplied to said rotor in response to a change in weight acting on said balance arm is measured.

References Cited in the file of this patent
UNITED STATES PATENTS

| 2,610,052 | Macgeorge | Sept. 9, 1952 |
| 2,754,109 | Eyraud | July 10, 1956 |

FOREIGN PATENTS

| 214,522 | Australia | Apr. 17, 1958 |
| 592,757 | Canada | Dec. 17, 1953 |
| 865,215 | Germany | Feb. 2, 1953 |

OTHER REFERENCES

Electromagnetic Balance, Research and Development Technical Report, U.S. Naval Radiological Defense Lab—TR-287 NS081-001, December 2, 1958.